(12) United States Patent
Hattori et al.

(10) Patent No.: US 8,052,463 B2
(45) Date of Patent: Nov. 8, 2011

(54) HARNESS-ROUTING PROTECTOR

(75) Inventors: Makoto Hattori, Aichi (JP); Kazuki Niwa, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 4 days.

(21) Appl. No.: 12/441,434

(22) PCT Filed: Oct. 10, 2008

(86) PCT No.: PCT/JP2008/068468
§ 371 (c)(1),
(2), (4) Date: Mar. 16, 2009

(87) PCT Pub. No.: WO2009/048138
PCT Pub. Date: Apr. 16, 2009

(65) Prior Publication Data
US 2010/0170698 A1    Jul. 8, 2010

(30) Foreign Application Priority Data

Oct. 12, 2007    (JP) ................................. 2007-266263

(51) Int. Cl.
*H01R 13/58*    (2006.01)
(52) U.S. Cl. .......................... 439/456; 439/457; 439/468
(58) Field of Classification Search .................. 439/449, 439/452, 456, 457, 459, 465–468, 470
See application file for complete search history.

(56) References Cited

U.S. PATENT DOCUMENTS

| | | | | |
|---|---|---|---|---|
| 3,958,300 | A * | 5/1976 | Tanaka ........................... | 174/68.1 |
| 5,315,062 | A * | 5/1994 | Hoshino ........................ | 439/446 |
| 6,231,375 | B1 * | 5/2001 | Kashiyama ................... | 439/456 |
| 6,364,693 | B1 * | 4/2002 | Stagg et al. ................... | 439/467 |
| 6,878,879 | B2 * | 4/2005 | Takahashi et al. ........... | 174/72 A |
| 2002/0177351 | A1 * | 11/2002 | Kihira et al. .................. | 439/468 |

(Continued)

FOREIGN PATENT DOCUMENTS

JP    53-122700 U    3/1977

(Continued)

OTHER PUBLICATIONS

International Search Report of PCT/JP2008/068468, date of mailing Nov. 25, 2008.

*Primary Examiner* — Tho D Ta
(74) *Attorney, Agent, or Firm* — Westerman, Hattori, Daniels & Adrian, LLP

(57) ABSTRACT

An object is to provide a harness-routing protector with a simple configuration that can be readily fabricated at low cost and can be readily attached to a harness so that the harness, which has a difficulty in maintaining a bent shape, can be readily routed without interfering with other components within a limited space. In a harness-routing protector (30) that routes a harness (10) while maintaining it in a predetermined bent shape so as to prevent it from interfering with other components, a cross-sectionally U-shaped semicylindrical body (34) has a predetermined bent shape and includes an inner guide surface (31) and an outer guide surface (32) that are separated from each other by a gap in which the harness (10) is fittable and a side surface (33) that joins one edge of the inner guide surface (31) and one edge of the outer guide surface (32) to each other, and both end surfaces and the other side surface thereof are open.

3 Claims, 4 Drawing Sheets

U.S. PATENT DOCUMENTS

2007/0093120 A1 * 4/2007 Hardy et al. .................. 439/468

FOREIGN PATENT DOCUMENTS

| JP | 53-122700 U | 9/1978 |
| JP | 64-7979 U | 1/1989 |
| JP | 2-34895 U | 3/1990 |
| JP | 05-334932 A | 12/1993 |
| JP | 10-006881 A | 1/1998 |
| JP | 2002-165326 A | 6/2002 |
| JP | 2004-064815 A | 2/2004 |
| JP | 2005-110419 A | 4/2005 |
| JP | 2006-132937 A | 5/2006 |
| JP | 2007-109497 A | 4/2007 |

* cited by examiner

HARNESS-ROUTING PROTECTOR

TECHNICAL FIELD

The present invention relates to a harness-routing protector that can route a harness, which has a relatively large cable diameter and has a difficulty in maintaining a bent shape by itself due to a springback effect, without causing the harness to interfere with other components within a limited space.

BACKGROUND ART

An electric compressor of a vehicle air conditioner is connected to power cables (i.e., a harness) that supply power from a power source, such as a battery, installed in a vehicle to an electric motor of the electric compressor. Since a large electric current flows through this harness, cables having a relatively large diameter and insulation-coated with corrugated tubes, etc. are used. The cables used are two positive and negative cables that are bound together, and because each cable may sometimes be thick, with an outside diameter on the order of ten millimeters, in some cases the cable cannot maintain a bent shape by itself due to a springback effect.

The aforementioned electric compressor for a vehicle is usually disposed inside an engine compartment which generally has no extra space, and it is thus practically difficult to route the harness, which is thick as mentioned above, in a straight line without causing it to interfere with other components. Thus, by attaching a protector to the harness to forcedly maintain the harness in a predetermined bent shape or in a folded shape by the intervention of the protector, the harness can conceivably be routed without interfering with other components within a small limited space.

As a protector used for routing a harness, Patent Document 1 discusses a type in which protector plates having one end curved in opposite directions from each other are hinged to each other, and each of the curved sections is provided with a holding portion having a wedge-shaped slit. The harness is routed by being inserted through the holding portions, thereby alleviating stress produced when the harness is bent. Patent Document 2 discusses a harness routing structure constituted by a harness holding member, which has a rectangular tubular shape in cross section and is curved into an arc shape, holds a wire harness by inserting the wire harness therethrough, and is rotatable about one end thereof, as well as a casing, which accommodates the harness holding member in an insertable/ejectable manner and pivotably supports the wire harness extending out from the other end of the harness holding member. The harness routing structure can allow for smooth two-dimensional movement of a sliding structure and can also allow for placement within a smaller amount of space. Patent Document 3 discusses a cable-folding holder equipped with a base plate having a reference folding line at an outer peripheral edge thereof and having flat cables placed respectively on the top surface and the bottom surface of the base plate, holding segments provided on the top surface and the bottom surface of the base plate so as to hold the flat cables so that they extend along the top surface and the bottom surface, and restraining portions that are provided on the base plate so as to restrain the flat cables held by the holding segments to prevent the flat cables from springing back towards the outside.

Patent Document 1:
Japanese Unexamined Patent Application, Publication No. Hei 10-6881

Patent Document 2:
Japanese Unexamined Patent Application, Publication No. 2004-64815

Patent Document 3:
Japanese Unexamined Patent Application, Publication No. 2007-109497

DISCLOSURE OF INVENTION

However, because the protectors discussed in the aforementioned Patent Documents 1 to 3 are equipped with the holding portions or the holding segments, for routing the cables by inserting the cables therethrough, or are equipped with the restraining portions, and thus have a complex structure constituted by a plurality of components, a large number of steps is required for fabricating the protector itself, which is problematic in that it leads to high cost. In addition, when attaching the protector to the cables, the attaching process is troublesome since the cables need to be inserted through the tubular or slit-like holding portions. Moreover, in cases where the cables have connectors attached to end portions thereof, there is a problem in that, for example, attachment of the protector is difficult, thus possibly creating a bottleneck in the routing process.

In view of the above circumstances, an object of the present invention is to provide a harness-routing protector with a simple configuration that can be readily fabricated at low cost and can be readily attached to a harness so that the harness, which has a difficulty in maintaining a bent shape, can be easily routed without interfering with other components within a limited space.

In order to achieve the aforementioned object, a harness-routing protector of the present invention employs the following solutions.

Specifically, in a harness-routing protector according to the present invention that routes a harness while maintaining the harness in a predetermined bent shape so as to prevent the harness from interfering with other components, the harness-routing protector is a cross-sectionally U-shaped semicylindrical body having a predetermined bent shape and including an inner guide surface and an outer guide surface that are separated from each other by a gap in which the harness is fittable and a side surface that joins one edge of the inner guide surface and one edge of the outer guide surface to each other, and both end surfaces and the other side surface thereof are open.

According to the present invention, with respect to the protector formed by the cross-sectionally U-shaped semicylindrical body having a predetermined bent shape and whose both end surfaces and the other side surface are open, the protector is attached by fitting the harness, while being bent, between the inner guide surface and the outer guide surface through the opening in the other side surface, whereby the harness can be maintained in a predetermined bent shape. Accordingly, with the addition of an easy step of simply fitting and attaching the protector to the bent cable section of the harness, the harness, which has a diameter in the order of, for example, ten millimeters or more and has a difficulty in maintaining a bent shape by itself due to a springback effect, can be routed without interfering with other components within a small limited space. Furthermore, since the protector itself can be formed by a cross-sectionally U-shaped semicylindrical body having a predetermined bent shape, the protector with a simple configuration can be readily fabricated at low cost.

The harness-routing protector of the present invention may be configured such that, in the aforementioned harness-routing protector, the inner guide surface and the outer guide surface of the semicylindrical body have a width in accordance with the number of cables constituting the harness.

According to this configuration, even if the harness is constituted by a plurality of cables, because the width of the inner guide surface and the outer guide surface is set in accordance with the number of cables, the protector can be reliably fitted and attached to the bent cable section of the harness. Accordingly, the harness, which has a difficulty in maintaining a bent shape due to a springback effect, can be readily routed while being maintained in a predetermined bent shape.

The harness-routing protector of the present invention may be configured such that, in the aforementioned harness-routing protector, the width of the inner guide surface and the outer guide surface increases gradually from one end to another end thereof towards an end portion of the harness where the cables thereof diverge from each other.

According to this configuration, the protector having a predetermined bent shape and whose width increases gradually from one end to another end so as to conform with the shape of the end portion of the harness can be fitted and attached to near the end portion, which is made wide since this is where the cables diverge from each other to attach a connector, etc. thereto. Accordingly, the protector can be securely attached to the harness in conformity to the shape thereof so that the harness, which has a difficulty in maintaining a bent shape due to a springback effect, can be readily routed while being maintained in a predetermined bent shape.

The harness-routing protector of the present invention may be configured such that, in one of the aforementioned harness-routing protectors, the width of the inner guide surface and the outer guide surface is set such that a part of the harness is exposed from an opening in the other side surface, and the semicylindrical body is attached to the harness and is tightly secured to the harness by tape wound around an outer periphery thereof.

According to this configuration, the protector is attached to the harness in a state such that a part thereof is exposed from the opening in the other side surface, and the protector and the harness are tightly secured to each other by winding tape around the outer periphery thereof. In this case, the tape is adhered to both the protector and the exposed part of the harness, whereby the two can be reliably secured to each other. Consequently, the protector can be reliably secured so as to prevent it from being detached, and the harness can be routed without interfering with other components within a small limited space.

The harness-routing protector of the present invention may be configured such that, in any one of the aforementioned harness-routing protectors, the cross-sectionally U-shaped semicylindrical body is an integrally molded product composed of a resin material.

According to this configuration, the cross-sectionally U-shaped semicylindrical body is an integrally molded product composed of a resin material and having a predetermined bent shape and a predetermined length. Accordingly, the protector itself can be readily fabricated at low cost by injection molding, etc.

According to the present invention, with the addition of an easy step of simply attaching the protector by fitting the harness between the inner guide surface and the outer guide surface of the protector, the harness, which has a difficulty in maintaining a bent shape due to a springback effect, can be maintained in a predetermined bent shape. Thus, the harness can be readily routed without interfering with other components within a limited space. Furthermore, since the protector itself can be formed by a cross-sectionally U-shaped semicylindrical body having a predetermined bent shape, the protector with a simple configuration can be readily fabricated at low cost.

EXPLANATION OF REFERENCE SIGNS

Figure 1:
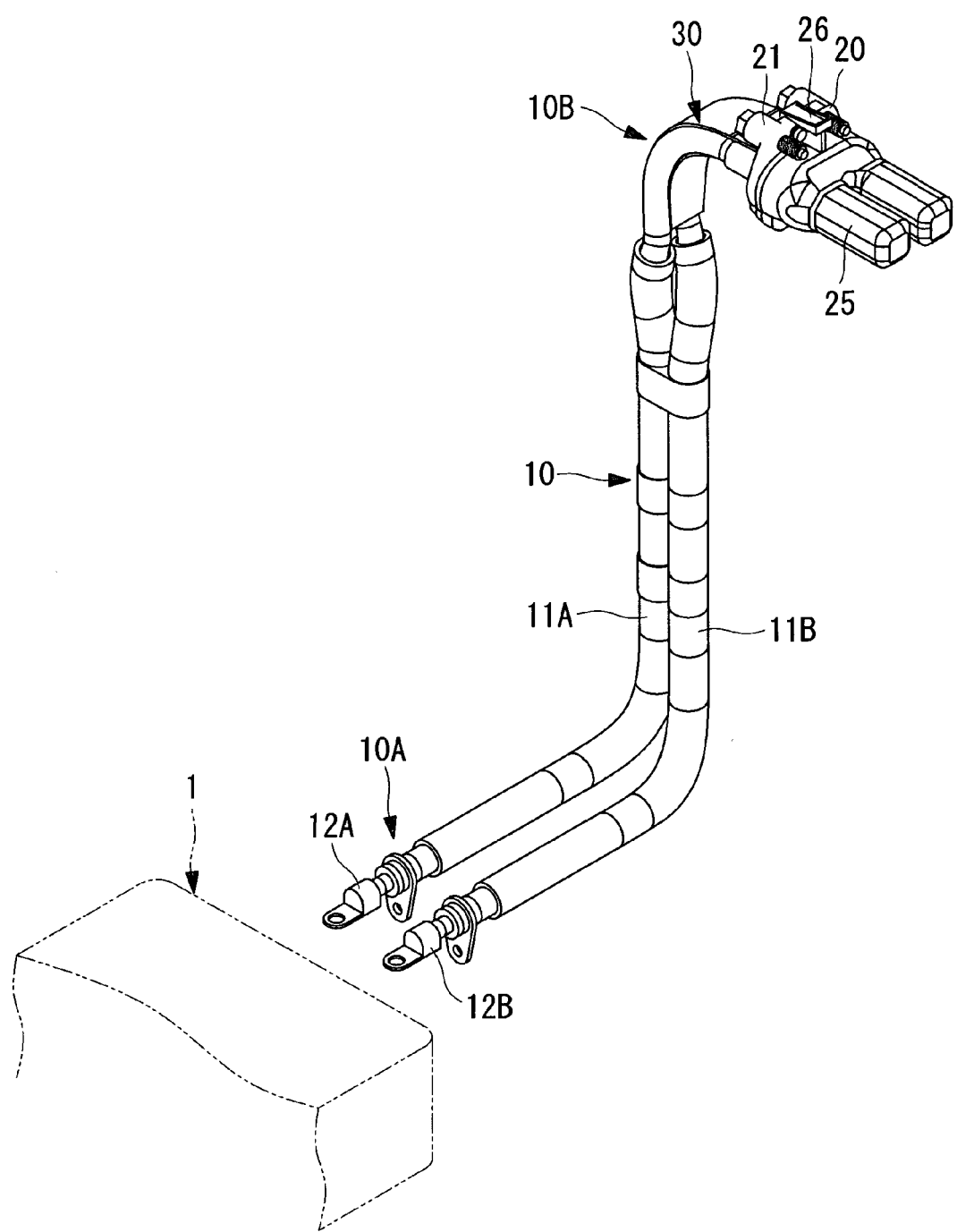
FIG. 1 is a perspective view of a harness assembly to which a harness-routing protector according to an embodiment of the present invention is attached.
Figure 2:
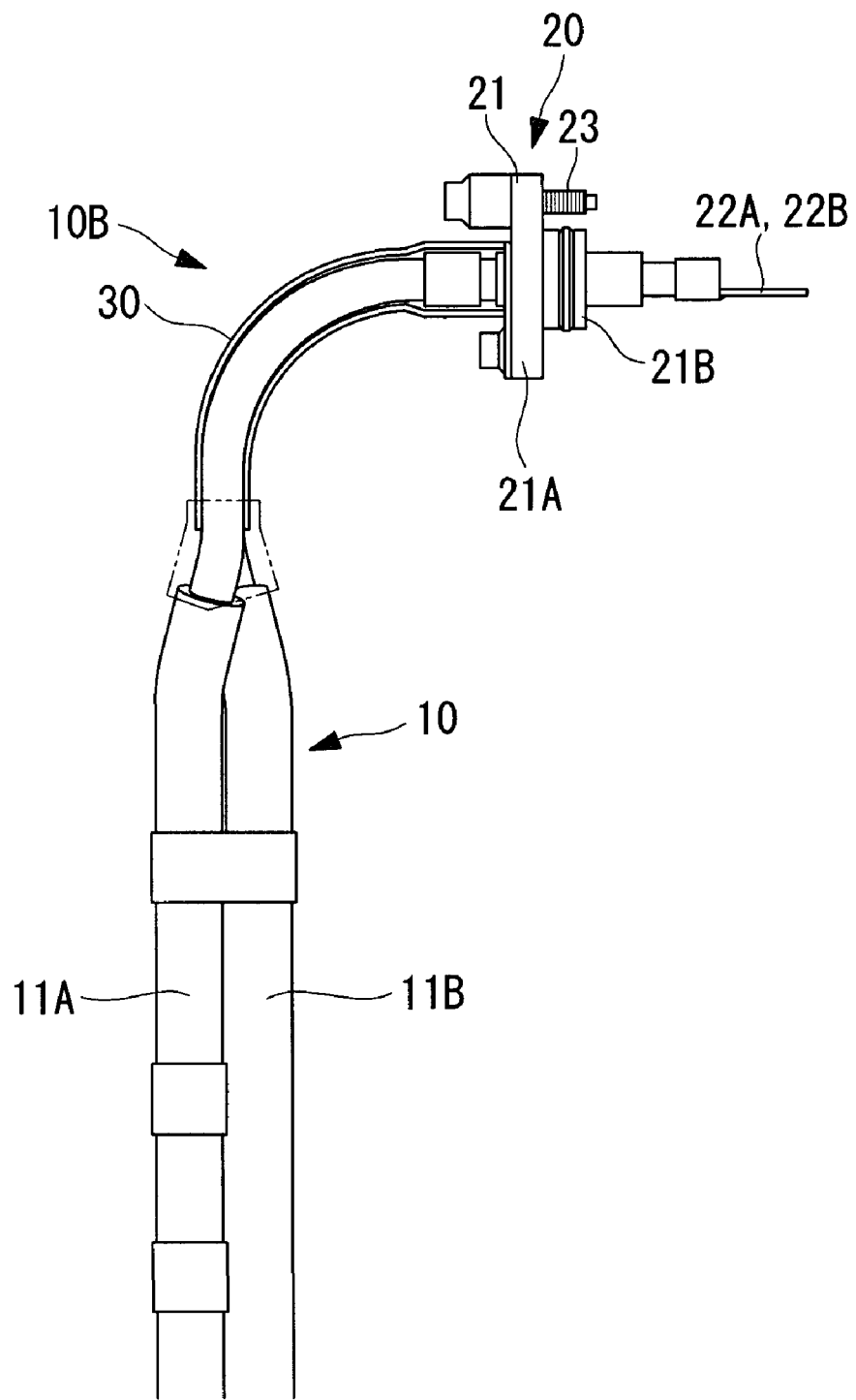
FIG. 2 is a side view of one end of the harness assembly to which the harness-routing protector shown in FIG. 1 is attached.

10: harness assembly (harness)
11A, 11B: cables
11a: exposed part
30: harness-routing protector
31: inner guide surface
32: outer guide surface
33: side surface
34: semicylindrical body
35: opening
L1, L2: widths of guide surfaces

BEST MODE FOR CARRYING OUT THE INVENTION

An embodiment of the present invention will be described below with reference to FIGS. 1 to 5C.

FIG. 1 is a perspective view showing a harness assembly (harness) 10 used in an electric compressor 1 of a vehicle air conditioner and also showing a protector 30 attached to the harness assembly 10 so as to route the harness assembly 10 while maintaining it in a predetermined bent shape. The electric compressor 1 is an integrated-inverter electric compressor containing an electric motor (not shown) that is driven via an inverter (not shown). A battery installed in a vehicle supplies power to the electric compressor 1 via the harness assembly 10, and the electric compressor 1 is driven at variable speed by the electric motor via the inverter.

As shown in FIGS. 1 to 4, the harness assembly 10 is constituted by two cables 11A and 11B that are insulation-coated with corrugated tubes, etc. and are respectively provided with positive and negative terminals 12A and 12B at one end 10A. The terminals 12A and 12B are connected to power input terminals of the inverter at the electric compressor 1 side. Another end 10B of the harness assembly 10 is provided with a connector 20 for connecting to the battery installed in the vehicle. The two positive and negative cables 11A and 11B used in this harness assembly 10 are bound together, and because each of the cables 11A and 11B is thick, with an outside diameter in the order of ten millimeters, it is difficult for the cable to maintain a bent shape by itself due to a springback effect.

The connector 20 is constituted by a connector body 21 having a flange 21A and a projection 21B with an oval shape in cross section and projecting orthogonally from one face of the flange 21A, a pair of positive and negative connector terminals 22A and 22B projecting forward from the connector body 21 and respectively connected to the two insulation-coated cables 11A and 11B, two bolts 23 provided in the connector body 21 for fixing the connector 20 to the vehicle, and a pin 24 provided in the connector body 21 for positioning a connector-terminal protection cap 25 (see FIG. 1) when attaching it.

The connector-terminal protection cap 25 is a protection cap to be attached to the connector body 21 to cover the exterior of the connector terminals 22A and 22B so as to prevent foreign matter, dust particles, or water droplets from adhering to the connector terminals 22A and 22B or to prevent the connector terminals from being damaged as a result of coming into contact with other components while the electric compressor 1 manufactured at a compressor manufacturing plant is being transported or shipped to a vehicle assembly plant. The connector-terminal protection cap 25 is fitted to the projection 21B of the connector body 21 and is detachably attached thereto by latching a pair of upper and lower claw members 26 onto the flange 21A.

The protector 30 is attached to the vicinity of the connector 20 at the end 10B of the harness assembly 10. As shown in FIG. 1, the protector 30 has a function for bending the harness assembly 10, which extends upward from below, into a substantially horizontal state so that the connector 20 provided at the end 10B can be readily connected to a power source, such as the battery, installed in the vehicle, and for routing the harness assembly 10 while maintaining the bent shape thereof so that the harness assembly 10 does not interfere with other components inside the engine compartment, which is small. In other words, the protector 30 is attached to the harness assembly 10, which has a difficulty in maintaining a bent shape by itself due to a springback effect, so as to route the harness assembly 10 while maintaining it in a predetermined bent shape.

Figure 5A:
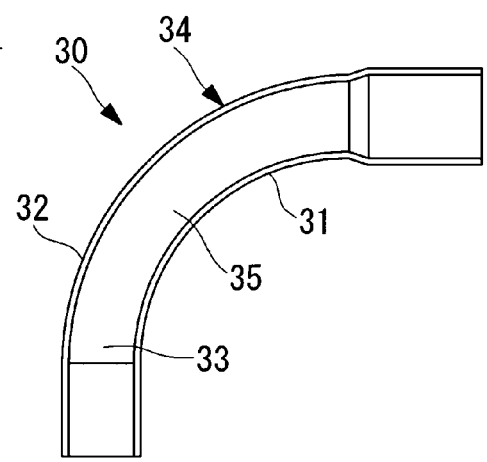
FIG. 5A is a side view of the harness-routing protector according to an embodiment of the present invention.
Figure 5B:
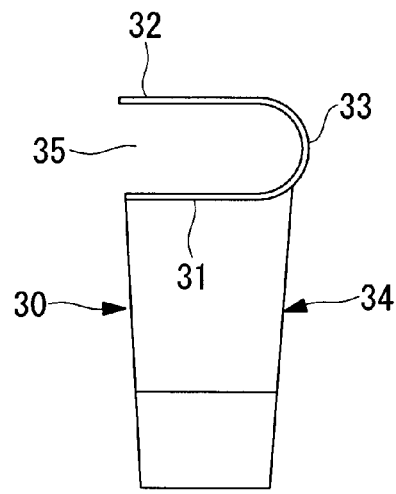
FIG. 5B is a right side view of the harness-routing protector according to an embodiment of the present invention.
Figure 5C:
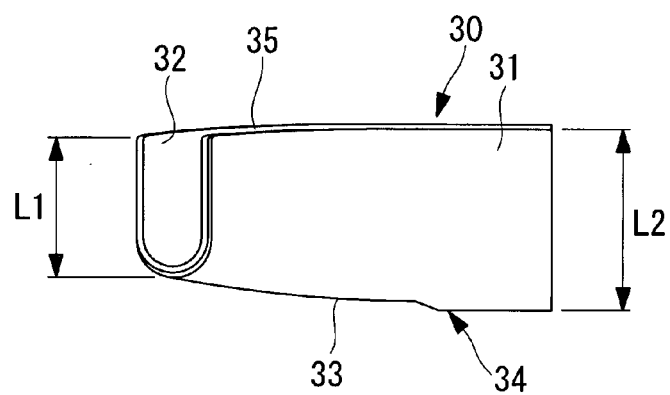
FIG. 5C is a bottom view of the harness-routing protector according to an embodiment of the present invention.

As shown in FIGS. 5A to 5C, the protector 30 is formed of an integrally molded product composed of a resin material such as nylon 66. Specifically, the protector 30 is integrally molded by injection molding, etc. and is constituted by a semicylindrical body 34 with a U-shape in cross section. The cross-sectionally U-shaped semicylindrical body 34 has a bent shape with a radius corresponding to a bending radius of the harness assembly 10 to be bent for routing, and includes an inner guide surface 31 and an outer guide surface 32 that are separated from each other by a gap in which the aforementioned cables 11A and 11B with an outside diameter in the order of ten millimeters can be fitted and a side surface 33 that joins one edge of the inner guide surface 31 and one edge of the outer guide surface 32 to each other. Both end surfaces and the other side surface of this semicylindrical body 34 are open, and the semicylindrical body 34 can be fitted to the harness assembly 10 through an opening 35 in the other side surface.

Figure 3:
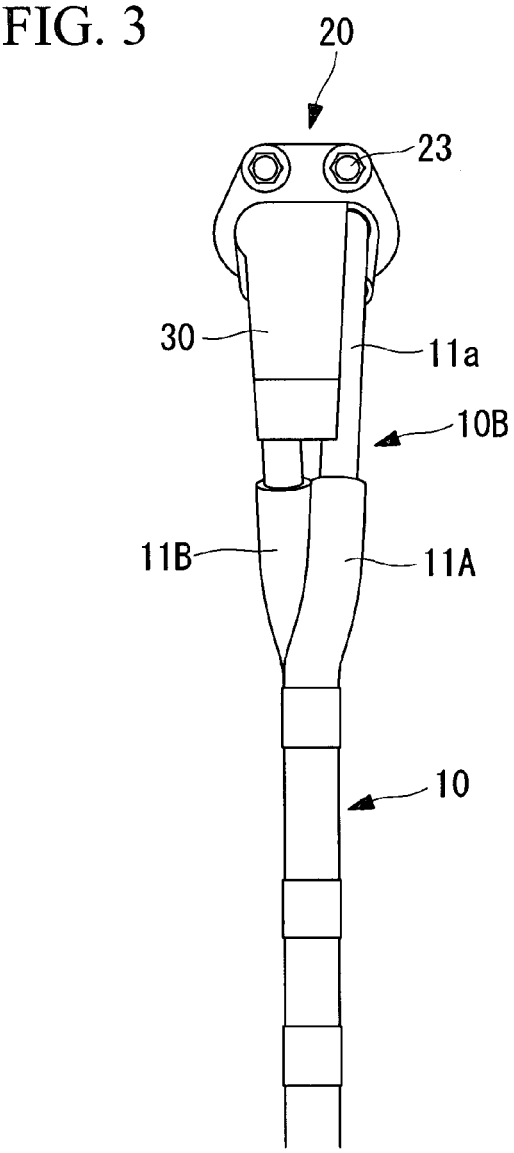
FIG. 3 is a left side view of the harness assembly shown in FIG. 2.
Figure 4:
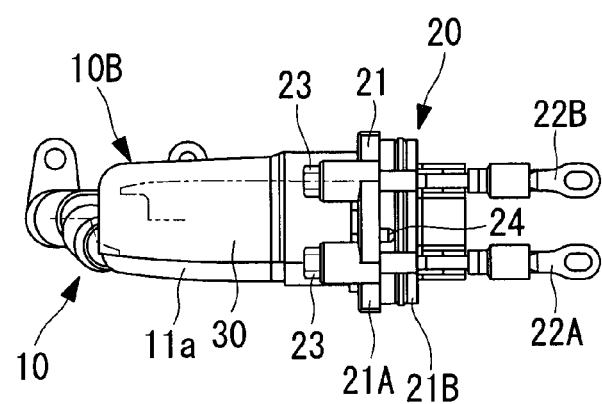
FIG. 4 is a top view of the harness assembly shown in FIG. 2.

The inner guide surface 31 and the outer guide surface 32 of the semicylindrical body 34 have a width that allows the two cables 11A and 11B constituting the harness assembly 10 to be fitted therein. In detail, the width is set such that when the two cables 11A and 11B constituting the harness assembly 10 are fitted between the inner and outer guide surfaces 31 and 32, a part of the cable 11A, positioned closer to the opening 35, is exposed from the opening 35, as shown in FIGS. 3 and 4 (the exposed part is denoted by 11a in FIGS. 3 and 4). Furthermore, widths L1 and L2 at both ends of the inner guide surface 31 and the outer guide surface 32 have the relationship L1<L2 such that the width increases gradually from one end to the other end towards an end portion of the harness assembly 10 where the cables 11A and 11B diverge from each other. By setting the width of the inner guide surface 31 and the outer guide surface 32 in this manner, when the protector 30 is to be attached to the harness assembly 10 and the two are to be secured to each other by taping using tape (not shown) wound around the outer periphery thereof, the tape can be adhered to both the protector 30 and the harness assembly 10, whereby the two can be reliably secured to each other.

According to the above configuration, the present embodiment provides the following advantages.

The harness assembly (harness) 10 is joined to the electric compressor 1 in a compressor production line by connecting the terminals 12A and 12B at the one end 10A to the power input terminals of the inverter built into the electric compressor 1. The connector-terminal protection cap 25 is attached to the connector 20 provided at the other end 10B of this harness assembly 10 so as to protect the connector terminals 22A and 22B. This connector-terminal protection cap 25 protects the connector terminals 22A and 22B of the harness assembly 10 by preventing foreign matter, dust particles, or water droplets from adhering to the connector terminals 22A and 22B or preventing the terminals 22A and 22B from being damaged as a result of coming into contact with other components while the electric compressor 1 is being transported or shipped to a vehicle assembly site.

Furthermore, the protector 30 for routing the harness assembly 10, which has a difficulty in maintaining a bent shape by itself due to a springback effect, is attached to the end 10B, adjacent to the connector 20, of the harness assembly 10 without causing the harness assembly 10 to interfere with other components inside the small engine compartment. After a bent cable section of the harness assembly 10, while being curved, is fitted between the inner guide surface 31 and the outer guide surface 32 through the opening 35 in the side surface of the protector 30, the outer periphery thereof is taped so as to attach and secure the protector 30 to the harness assembly 10. Consequently, the harness assembly 10, which tends to spring back, can be maintained in a predetermined bent shape. The electric compressor 1 in this state is transported or shipped to a vehicle assembly plant so as to be fitted in the engine compartment, etc. of a vehicle while the harness assembly 10 is connected to a power source, such as a battery or a power-source unit. In this case, inside the engine compartment, etc., the harness assembly 10 can be readily connected to the battery or the power-source unit.

Accordingly, with the addition of an easy step of simply fitting and attaching the protector 30 to the bent cable section of the harness assembly 10, the harness assembly 10, which has a difficulty in maintaining a bent shape by itself due to a springback effect, can be bent into a predetermined shape and can be readily routed without interfering with other components in a small limited space inside the engine compartment, etc. Furthermore, since an integrally molded product composed of a resin material can be used as the cross-sectionally U-shaped semicylindrical body having a predetermined bent shape, the protector 30 can be integrally molded by injection molding, etc. Consequently, the protector 30 with a simple configuration can be readily fabricated at low cost.

Furthermore, the width of the inner guide surface 31 and the outer guide surface 32 of the protector 30 is set such that when the two cables 11A and 11B constituting the harness assembly 10 are fitted between the guide surfaces 31 and 32, a part of the cable 11A, positioned closer to the opening 35, is exposed from the opening 35. Moreover, the widths L1 and L2 at both ends of the inner guide surface 31 and the outer guide surface 32 have the relationship L1<L2 such that the width increases gradually from one end to the other end towards the end portion of the harness assembly 10 where the cables 11A and 11B diverge from each other. Thus, the protector 30 can be attached to the harness assembly 10 in conformity to the shape thereof, and when the two are to be secured to each other by taping using tape wound around the outer periphery thereof, the tape can be adhered to both the protector 30 and the harness assembly 10, whereby the two can be firmly secured to each other. Consequently, the protector 30 can be reliably secured so as to prevent it from being detached, and the harness assembly 10 can be routed without interfering with other components within a small space.

The present invention is not limited to the above embodiment, and modifications are permissible so long as they do not depart from the scope of the invention. For example, although the harness assembly 10 described above as an example uses two cables 11A and 11B that are bound together, it is needless to say that the present invention is applicable to a harness assembly constituted by one cable or three or more cables. In that case, the width of the inner guide surface 31 and the outer guide surface 32 of the protector 30 is set in accordance with the number of cables. Moreover, the bent shape, the magnitude of the bending radius, or the bending position of the harness assembly 10 can be freely chosen, and in that case, it is needless to say that the protector 30 is fabricated to conform thereto. Furthermore, the bent shape is not limited to an arc.

The invention claimed is:

1. A harness-routing protector that routes a harness while maintaining the harness in a predetermined bent shape so as to prevent the harness from interfering with other components, wherein the harness-routing protector is an integrally molded cross-sectionally U-shaped semicylindrical body having a predetermined bent shape and configured with an inner guide surface, an outer guide surface and a side surface that is configured by having one edge of the inner guide surface and one edge of the outer guide surface continuous, both end surfaces and the other side surface thereof are open, and the harness is fittable in a gap between the inner guide surface and the outer guide surface, the gap being an opening of the cross-sectionally U-shaped semicylindrical body;

wherein the inner guide surface and the outer guide surface of the semicylindrical body have a width in accordance with the number of cables constituting the harness;

wherein the width of the inner guide surface and the outer guide surface increases gradually from one end to another end thereof towards an end portion of the harness where the cables thereof diverge from each other.

2. The harness-routing protector according to claim 1, wherein the width of the inner guide surface and the outer guide surface is set such that a part of the harness is exposed from an opening in the other side surface, and wherein the semicylindrical body is attached to the harness and is tightly secured to the harness by tape wound around an outer periphery thereof.

3. The harness-routing protector according to claim 1, which is composed of a plastic material.

* * * * *